Figure 1:
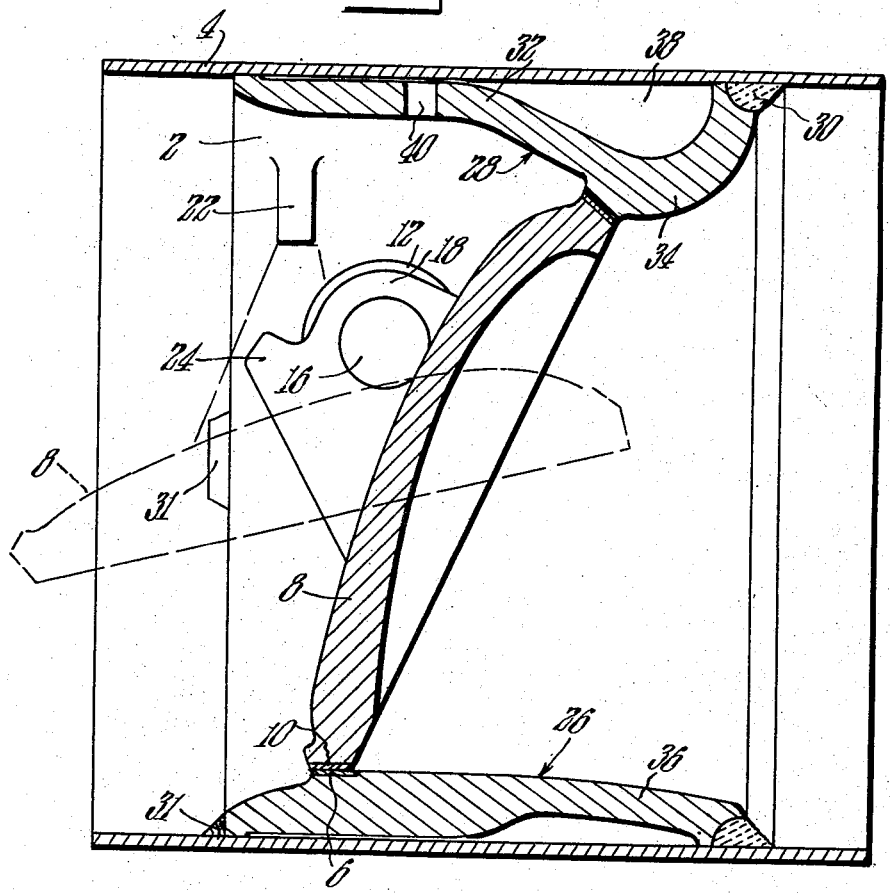

June 21, 1955   E. K. NICKERSON   2,711,188
CHECK VALVE

Filed May 10, 1951   2 Sheets-Sheet 2

Inventor
Elmer K. Nickerson.

2,711,188

CHECK VALVE

Elmer K. Nickerson, Springfield, Mass., assignor to The Chapman Valve Manufacturing Company, Springfield, Mass., a corporation of Massachusetts Application May 10, 1951, Serial No. 225,551

1 Claim. (Cl. 137—527.8)

This invention relates to improvements in valve apparatus and is directed more particularly to improvements in check valves.

The principal object of the invention is the provision of unitary check valve apparatus which is adapted for insertion in a pipe line in association with which it is to function as a check.

Prior art check valves used in long pipe lines such as used for transporting oil and the like are usually of heavy construction in that they include a great amount of metal and consequently are costly.

The pipe sections used in the long pipe lines where high pressures prevail are commonly made from steel or alloys which are treated in various ways so that the pipe will efficiently resist the stresses and strains resulting from high pressures while possessing a minimum safe wall thickness in order thereby to reduce weight and favorably affect cost. A wall thickness of one-half inch for high pressures is not an uncommon practice.

Pipe sections for the pipe line are ordinarily welded but the ends of the sections to be connected to the check valve are flanged for bolting to the flanges of the check valve. Flanged connections are likely to develop leaks and require a certain amount of maintenance which is objectionable.

Due to codes, regulations and other reasons, the wall thickness of the check valves and flanges are required to be much thicker than the wall of pipe, oftentimes several inches in thickness which results in a great amount of metal so as to be costly in addition to the difficulties arising from the objectionable flange connections, etc.

According to the novel features of this invention, a unitary check valve structure is provided which is insertable as a complete structure in and secured to a pipe section and cooperates therewith as a check valve for the pipe line. In this way a considerable amount of metal is eliminated over prior art valves thereby to enhance valve costs and obviate objectionable conditions.

As a special feature of the invention, the check valve is constructed and arranged in a novel manner so as to not reduce the pipe area appreciably or unfavorably affect the pressure and flow along the pipe line.

All of the above objects I accomplish by means of such structure and relative arrangements of parts thereof, as will fully appear by a perusal of the description below and by various specific features which will be hereinafter set forth.

Figure 2:
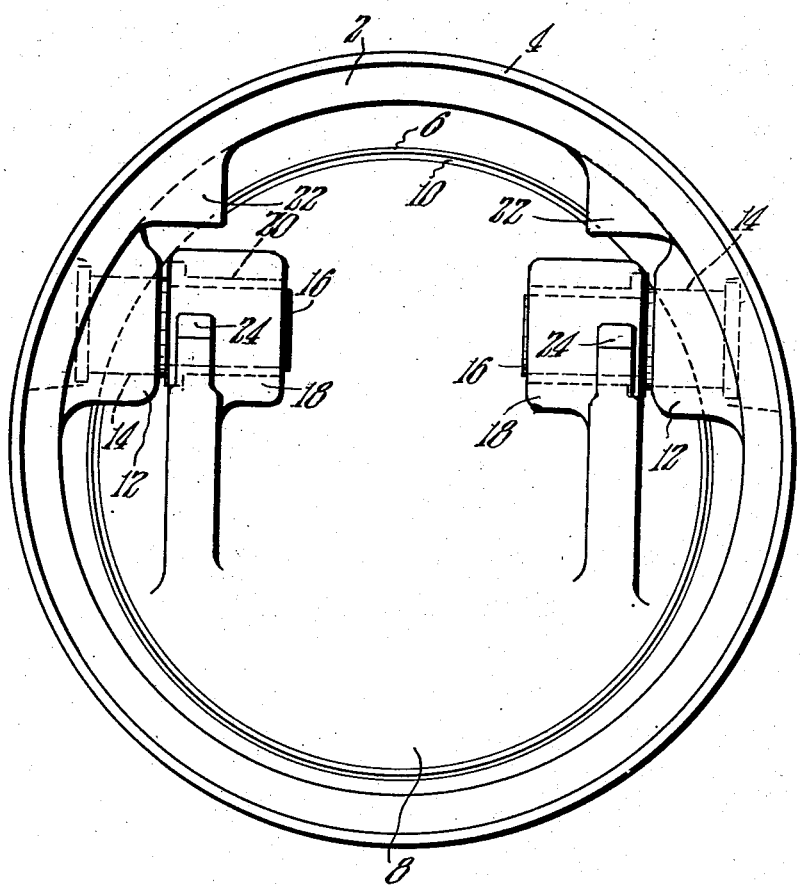

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is a vertical sectional elevational view through a valve structure and pipe embodying the novel features of the invention; and Fig. 2 is a front elevational view of a check valve of the invention shown in association with a section of pipe.

Referring now to the drawings more in detail, the invention will be fully described.

An elongated ring or shell member 2 is provided which is generally cylindrical having an annular wall and is adapted for insertion in a section of pipe represented by 4. Opposite ends of the shell have a certain diameter for cooperation with a pipe section having a certain internal diameter.

The wall of the shell on its inner side is formed to provide a passageway which may have a seat therearound which is indicated by 6.

A disc 8 has a seat 10 therearound for seating engagement with the seat 6 and is mounted for swinging movements between the full line closed position and the dash line open position.

The disc is mounted for swinging movements by bosses 12 provided interiorly of the shell and at opposite sides of the passageway which have pivot pins 14 secured therein provided with inner portions 16 extending inwardly towards one another, as shown. The pivot pins may be secured in place by welding or the like.

The disc 8 is provided with ears 18 which are journalled on the pivot pin portions 16 and for this purpose the said ears may be provided with bushings 20 in which the pivot pin portions 16 are receivable.

The pivot pins may be secured in the bosses in any desired manner, as by welding, and are insertable therein with the shell outside the pipe section 4.

Transversely spaced stops 22 within the shell are provided for engagement by projections 24 of the disc to limit the swinging of the disc to open position.

The inner face of the wall of the shell is formed so as to converge from opposite ends of the shell inwardly to said passageway, as shown.

The shell 2 is formed to have a certain outside diameter at opposite ends thereof to facilitate insertion of the shell in a pipe section such as 4 and being so inserted, one end such as the entrance end is welded to the pipe as at 30. The said welding 30 will extend circumferentially around the end of the shell.

The opposite or discharge end of the shell is preferably secured to the pipe by welding at spaced points such as 31.

Thus the shell is secured in the pipe section so that the structure may function as a check valve while being entirely contained within said pipe section.

The wall of the shell being formed to provide the inner converging face has its outer face intermediate opposite ends thereof formed to provide in conjunction with the pipe a space or chamber 38 surrounding the shell, as shown. Some portions of the wall formed to provide the chamber are indicated by 32, 34 and 36. The wall of the shell is provided with an opening 40 therethrough into the chamber.

With the disc in closed position by reason of pressure thereagainst, pressure enters the opening 40 so that pressure on opposite sides of the wall of the shell is equalized and obviates the likelihood of damage caused by unequal pressure. Furthermore, a considerable saving in metal and resulting weight is accomplished by spacing the wall from the pipe section while at the same time the wall provides the converging inner faces of the wall of the shell.

Preferably the axis of the passageway will be angularly disposed relative to the longitudinal axis of the shell and pipe section thereby to locate the plane of the seat obliquely relative to said longitudinal axis whereby the diameter of the passageway will not be appreciably less than the area of the pipe section so as to unfavorably affect the flow through the pipe line.

The converging inner sides of the wall of the shell provide a narrowing inlet to an outlet from the passageway so as to have the general function of a Venturi whereby the conditions of flow and pressure are not unfavorably affected when the disc is in open position.

It will be observed that the structure is self-contained so as to be insertable in a pipe section and adapted to function for efficiently checking back flow.

The novel construction not only eliminates the excessive weight and cost of prior art valves but flange connections and bolting is rendered unnecessary.

The pivotal axis of the disc is disposed as it is relative to the longitudinal axis of the shell and pipe section and the axis of the passage to obtain the desired swinging of the disc and make it possible to provide a passageway which is of large diameter relative to that of the pipe.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What is is desired to claim and secure by Letters Patent of the United States is:

A unitary check valve structure for welding in a high pressure pipe line comprising in combination, an elongated pipe section and a unitary check valve completely enclosed and fixed in said section, said pipe section being imperforate and having opposite ends adapted to be welded to adjacent ends of adjacent pipe sections in a high pressure pipe line for the flow of fluid therethrough, said check valve including a body in the form of a one piece elongated annular wall provided with inner and outer sides with opposite end portions of the outer sides of said wall fitting the inner side of the pipe section and thereof being disposed inwardly from said pipe section said outer side of said wall between said end portions thereof being disposed inwardly from said pipe section to provide a space between said pipe section and wall, the inner side of said wall being formed to provide a circular fluid passageway between opposite ends of the wall and having circular seat means therearound converging from one end of the wall on an axis oblique to the longitudinal axis of the pipe section, a circular valve disc having a seat complemental to said seat means for seating thereon in closed position thereof, pivotal connections between said disc and wall disposed wholly within said pipe section and between said one end of the wall and said passageway for swinging of said disc between open and closed positions thereof, said pivotal connections including separate aligned pivot pins extending inwardly from the inner side of said wall on axes transverse to the longitudinal axis of the pipe section and separate ears fixed on opposite marginal sides of said disc oscillatable on said pins for swinging of the disc between open and closed positions, inner adjacent portions of said pivot pins and ears being spaced apart transversely providing a space therebetween in line with the passageway of the wall, the inner side of said wall being generally inclined from opposite ends thereof towards said passageway and seat means, and said wall between said one end thereof and said passageway provided with a passageway for equalization of fluid pressure in the space between said wall and pipe section and within said one end of the wall in closed position of the valve disc.

References Cited in the file of this patent

UNITED STATES PATENTS

| | | |
|---|---|---|
| 182,355 | Campbell | Sept. 19, 1876 |
| 286,676 | Belknap | Oct. 16, 1883 |
| 978,757 | Johnson | Dec. 13, 1910 |
| 996,099 | Leidecker | June 27, 1911 |
| 1,306,391 | Romanoff | June 10, 1919 |
| 1,313,478 | Fontaine | Aug. 19, 1919 |
| 2,138,098 | Holmes | Nov. 29, 1938 |
| 2,363,943 | Carlson | Nov. 28, 1944 |
| 2,414,751 | Ludeman | Jan. 21, 1947 |
| 2,520,364 | Hobbs | Aug. 29, 1950 |
| 2,588,775 | Smolensky | Mar. 11, 1952 |
| 2,669,419 | Young | Feb. 16, 1954 |